May 6, 1930.	G. BAUER ET AL	1,757,827
ARRANGEMENT FOR FILLING, AND MAINTAINING
FILLED, HYDRAULIC CLUTCHES OR GEARS
Filed Sept. 2, 1924

Inventors:
Gustav Bauer
Rudolf Wälde
Hans Kluge
by: Herbert G. Ry
Attorney.

Patented May 6, 1930

1,757,827

UNITED STATES PATENT OFFICE

GUSTAV BAUER AND RUDOLF WÄLDE, OF HAMBURG, AND HANS KLUGE, OF HAMBURG-GR. BORSTEL, GERMANY

ARRANGEMENT FOR FILLING AND MAINTAINING FILLED HYDRAULIC CLUTCHES OR GEARS

Application filed September 2, 1924, Serial No. 735,525, and in Germany March 5, 1924.

The present invention relates to hydraulic clutches or gears, that is to say to devices in which a rotation is transmitted by means of a liquid, and is more particularly concerned with means for facilitating the filling and emptying of such devices. For this means a filling pump is ordinarily provided and also an auxiliary pump the function of which is to maintain the hydraulic device filled during working in spite of unavoidable leakage.

According to the present invention the filling and auxiliary pumps are driven by the same shaft in such a manner that the auxiliary pump is in action during the whole time that the shaft is revolving and the main filling pump may be coupled to this shaft when required. The means of coupling the filling pump to its driving shaft may comprise a hydraulic clutch adapted to be filled by means of the auxiliary pump, and a suitable valve may be provided for connecting the auxiliary pump either to the clutch associated with the filling pump or to the main hydraulic device.

Figure 1:
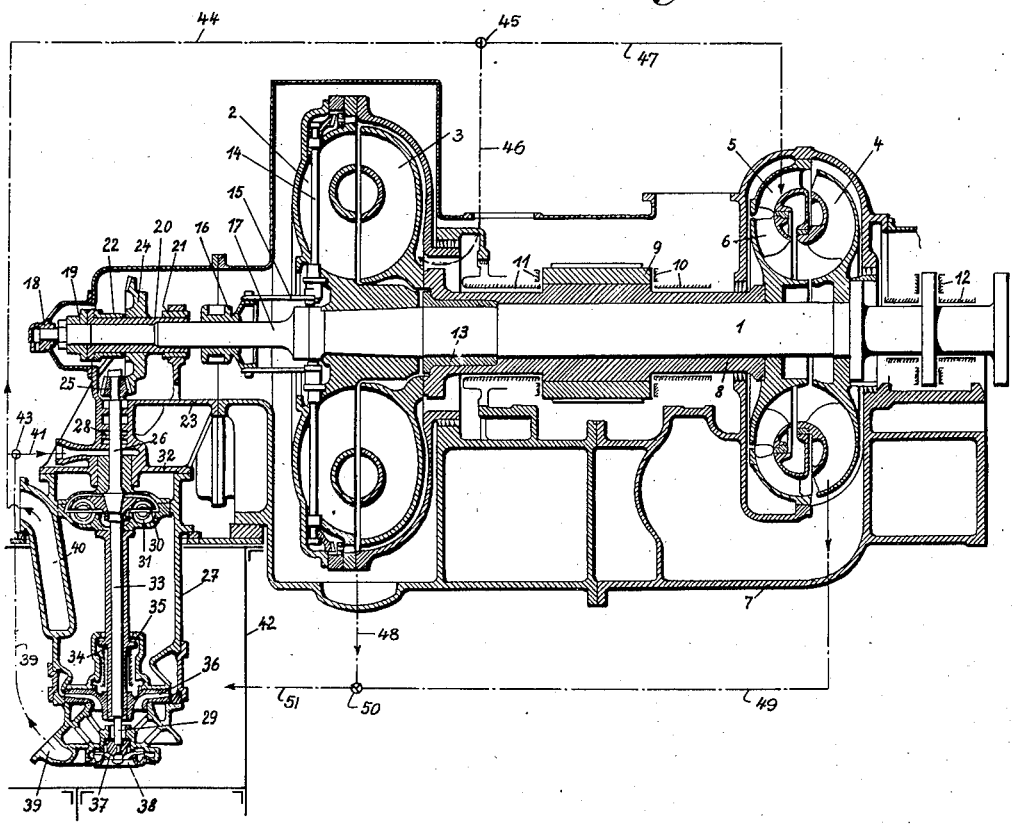
Figure 2:
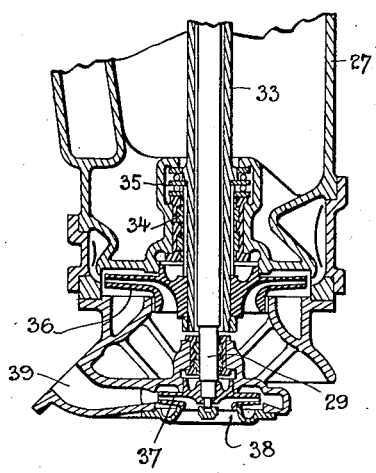

In order that the invention may be clearly understood and readily carried into effect, it will be described with reference to the accompanying drawing in which, by way of example, Fig. 1 shows in longitudinal section a hydraulic clutch or gear and the pumps accessory thereto, the connecting pipes and valve being shown diagrammatically and Fig. 2 an enlarged section through a part of Fig. 1.

1 designates the main driving shaft, 2 the driving wheel and 3 the driven wheel of a liquid coupling for forward motion, 4 the driving wheel, 5 the reversing ring and 6 the driven wheel of a liquid coupling for reversing the direction of rotation; 7 is a housing which surrounds both coupling units as well as the entire liquid gearing; 8 is a shaft for a pinion, which carries a toothed pinion or other power transmission member 9; 10 and 11 are bearings for the shaft 8; 12 is a bearing for the main shaft 1; 13 a supporting bearing for the shaft 1; 14, 15 and 16 represent a driving mechanism for emptying the liquid coupling for forward rotation which consists of the members 2 and 3; 17 is an extension of the main driving shaft, 18 a bearing, 19 a dog-clutch, 20 an intermediate shaft, 21 and 22 are bearings, 23 a bearing cap, 24 and 25 are bevel gears, 26 a shaft, 27 a casing, 28 and 29 are the pressure and supporting bearings for the shaft 26; 32 the bearing for the auxiliary liquid coupling 30, 31; 34 and 35 are the bearings for the hollow shaft 33, 36 a filling or maneuvering pump, 37 an auxiliary pump, 38 the inlet for the liquid for the auxiliary pump 37, 39 the outlet for said auxiliary pump, 40 the outlet for the filling or maneuvering pump 36, 41 the inlet serving for the filling of the liquid coupling 30, 31. 42 is a collecting tank and 43 a valve which is controlled by the maneuvering device, said valve 43 being operated according to demand either by hand or by means of a motor or the like.

In using the apparatus, when it is desired to fill either the forward or reverse unit the valve 43 is set to the position to connect the auxiliary pump 37 with the liquid clutch 30, thereby rotating the filling pump 36. This communicates by means of its outlet 40 with either the forward or reverse hydraulic unit and according to the setting of the main control valves. When this unit has been filled the valve 43 is operated to disconnect the auxiliary pump 37 from the hydraulic clutch 30 and to connect it with the main hydraulic unit which is in operation. The clutch 30 is thus allowed to empty and the filling pump 36 ceases its action, while the auxiliary pump 37 functions to maintain the main unit, to which it is connected, filled.

According to this invention the drive operates as follows:

During operation of the main engine the main driving shaft 1 is operated and by means of the extension 17, the clutch 19, the pair of bevel gears 24 and 25, and the shaft 26, the auxiliary pump 37 will be put into operative condition. If now the hydraulic clutch is to be filled, the filling liquid will be carried into the auxiliary liquid coupling 30, 31 by means of the valve 43 through the outlets 39 and 41. By this the hollow shaft 33 will be operated which will cause the filling pump 36 to come into operative condition.

By means of the pump 36 the members 2 and 3 of the liquid coupling for forward travel will be filled by way of the pipe 44, the three-way valve 45, and the pipe 46. The valve 43 may be adjusted by means of a proper connection with the main maneuvering valve, such as a connecting rod, a lever or the like of ordinary construction. This connection is not shown in the drawing for the sake of simplicity. For travel in backward direction the valve 45 will be properly adjusted, thus filling the liquid coupling 4, 5 and 6 for backward travel by way of the pipe 47 which will cause the pinion 9 and therewith the working shaft to be operated. When the liquid coupling 2, 3 or the liquid coupling 4, 5, 6 is in filled condition, the supply of liquid to the auxiliary liquid coupling 30, 31 will be prevented by properly adjusting the valve 43. The auxiliary liquid coupling 30, 31 will now be emptied by itself by reason of the liquid discharging by action of centrifugal force at the periphery and entering the collecting tank 42. The pipe conduit 49, the valve 50 and the conduit 51 serve for discharging the liquid from the liquid coupling 4, 5, 6 serving for backward travel into the collecting tank 42. A further pipe connection 48 is provided intermediate the valve 50 and the liquid coupling 2, 3. The pump 36 will thereby be put out of operation and by reason of the newly adjusted position of the valve 43 the liquid will be conveyed from the auxiliary pump 37 by way of the pipe or outlet 39, the valve 43, the pipe 44, the three-way valve 45, the pipe 46 into the coupling 2, 3 serving for forward rotation, if the latter is in operative condition, or by way of the three-way valve 45, the pipe 47 into the coupling 4, 5, 6 serving for the backward travel if said latter coupling is in operative condition. The auxiliary pump 37 is now directly connected with the coupling 2, 3 or 4, 5, 6, and serves for furnishing a substitute for the liquid lost by leakage. If a maneuvering is desired, the auxiliary liquid coupling 30, 31 will be filled by means of the valve 43 and the auxiliary pump 37, while the other part of the hydraulic clutch will now again be filled by means of the filling pump which is again put into operation.

We claim:

1. An arrangement for filling and maintaining hydraulic clutches in filled condition, comprising the combination of a filling pump for filling the main hydraulic units of the clutch; an auxiliary pump for maintaining said hydraulic units filled in spite of unavoidable leakage; a common driving shaft for both of said pumps; and means for disconnecting said filling pump from said shaft to permit continuous operation of said auxiliary pump and intermittent operation of said filling pump.

2. An arrangement as specified by claim 1, wherein the means for disconnecting the filling pump from the shaft which is common to both pumps consists of a hydraulic clutch.

3. An arrangement as specified by claim 1, wherein the means for disconnecting the filling pump from the shaft which is common to both pumps consists of a hydraulic clutch; said hydraulic clutch being adapted to be filled by the auxiliary pump.

4. An arrangement as specified by claim 1, wherein the means for disconnecting the filling pump from the shaft which is common to both pumps consists of a hydraulic clutch; said hydraulic clutch being adapted to be filled by the auxiliary pump; and having a valve by means of which the auxiliary pump may be connected according to requirements with said hydraulic clutch for the filling pump or with the main hydraulic clutch.

In testimony whereof we affix our signatures.

GUSTAV BAUER.
RUDOLF WÄLDE.
HANS KLUGE.